Patented Sept. 18, 1923.

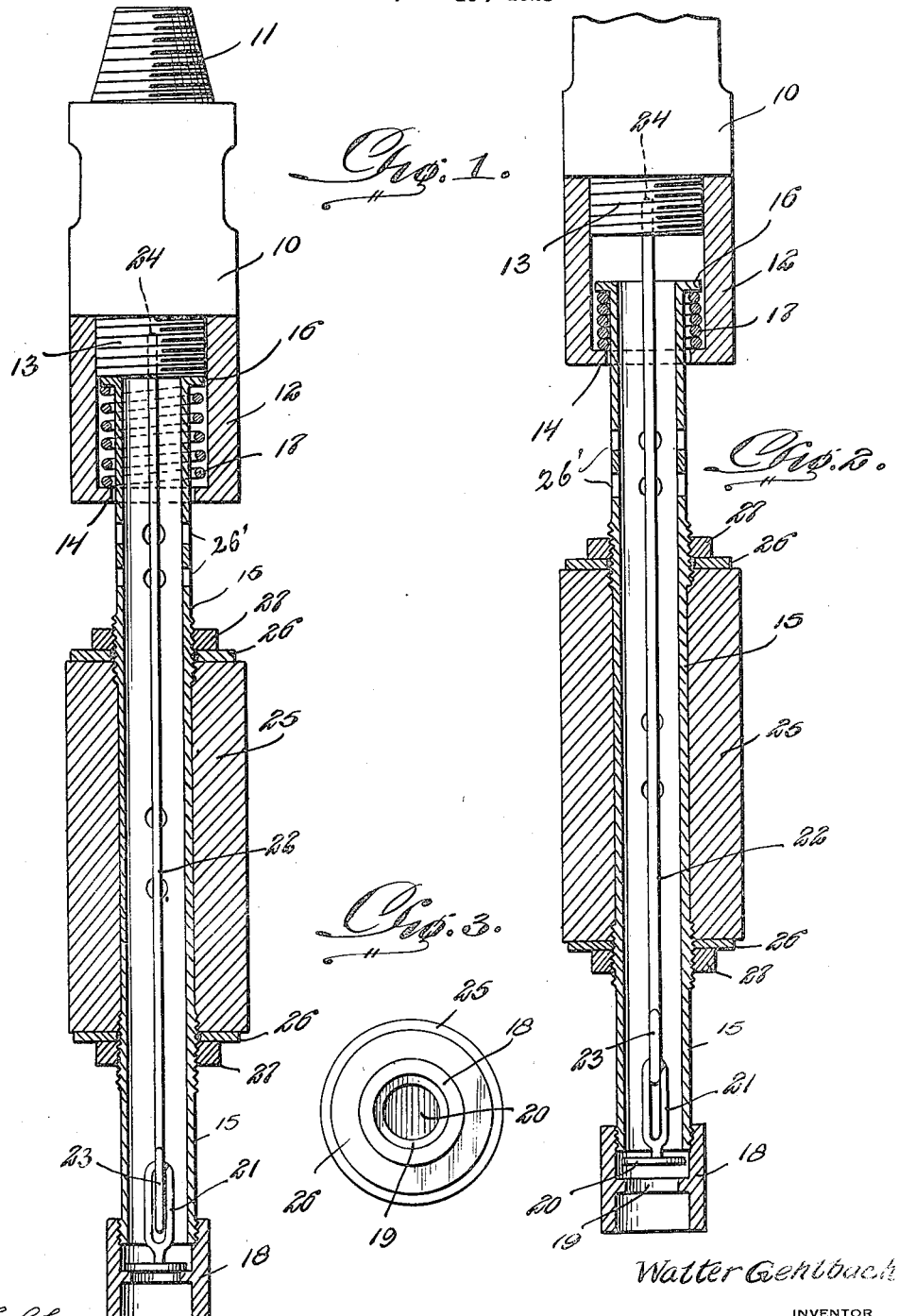

1,468,017

UNITED STATES PATENT OFFICE.

WALTER GEHLBACH, OF INDEPENDENCE, KANSAS.

SWAB.

Application filed April 19, 1921. Serial No. 462,654.

*To all whom it may concern:*

Be it known that I, WALTER GEHLBACH, residing at Independence, in the county of Montgomery and State of Kansas, have invented new and useful Improvements in Swabs, of which the following is a specification.

This invention relates to improvements in swabs for swabbing or pumping heavy producing oil wells. In swabbing oil wells, the swab when lowered into the hole is liable to reach too great a depth, so that it is almost impossible to pull the swab out of the hole again, on account of the great quantity of oil above the swab. The present invention aims to overcome this objection by providing means for relieving this pressure of oil, when an upward pull is exerted upon the swab.

With the above and other objects in view, the invention further includes the following novel features and details of construction, to be hereinafter more fully described, illustrated in the accompanying drawings and pointed out in the appended claims.

In the drawings:—

Figure 1 is a vertical section showing the swab in normal position, that is, with the relief valve closed.

Figure 2 is a similar view with the valve open.

Figure 3 is a bottom plan view.

Referring in detail to the drawings, wherein like characters of reference denote corresponding parts, the reference character 10 indicates a coupling which is provided at one end with a tapered threaded extension 11 for connection with the string of pipe or rods, by means of which the swab is operated. The coupling 10 is of sectional formation and includes a sleeve 12, which is connected to the main body portion of the coupling by threaded engagement with an extension 13. The lower or outer end of the sleeve 12 is provided with an annular flange 13 which surrounds an opening, through which passes a tubular member or pipe 15. The inner end of this pipe is provided with an outwardly extending annular flange 16 and located within the sleeve and surrounding the pipe 15 between the flanges 14 and 16 is a coiled spring 17.

The lower end of the pipe 15 has connected thereto a valve cage 18, within which is provided a seat 19 for a valve 20. This valve is normally seated and is provided with a link 21, for connection with a rod 22. This connection is affected through the medium of an eye 23 which engages the link 21, while the opposite upper end of the rod 22 is connected to the main body portion of the coupling 10, as shown at 24.

Surrounding the pipe 15 is a piston 25, which is preferably formed of rubber and is held in position upon the pipe 15 by means of washers 26 and adjusting nuts 27.

When the swab is lowered into the hole and it is desired to pull the same out, engagement of the rubbed piston 25 with the well casing, would ordinarily cause the swab to stick, in the event of an appreciable amount of oil being above the swab. In the present invention however, this pressure is relieved by the provision of openings 26', which are provided in the pipe 15 between the sleeve 12 and the piston 25. The oil enters the pipe through these openings and as the coupling member 10 moves upward away from the piston 25, the valve 20 is lifted from its seat and the oil is permitted to pass downward through the bottom of the valve cage 18. The oil will thus flow outward until pressure is relieved sufficiently to permit withdrawal of the swab.

The invention is susceptible of various changes in its form, proportions and minor details of construction and the right is herein reserved to make such changes as properly fall within the scope of the appended claims.

Having described the invention what is claimed is:—

1. A swab for wells, comprising a hollow tubular member, a piston secured thereon, a coupling yieldably connected to one end of the tubular member, said tubular member having openings therein between the piston and coupling, a valve provided in the lower end of the tubular member and means whereby relative movement of the coupling and tubular member will operate the valve.

2. A swab for wells comprising a hollow tubular member, a piston secured thereon, a coupling yieldably connected to one end of the tubular member, said tubular member having openings therein between the piston and coupling, a longitudinally movable valve provided in the lower end of the tubular member and a rod connecting the valve and coupling, whereby independent movement of the coupling will operate the valve.

3. A swab for wells comprising a hollow tubular member, a piston secured thereon, a coupling yieldably connected to one end of the tubular member, said tubular member having openings therein between the piston and coupling, said coupling including a detachable sleeve and a flange surrounding the lower open end of the sleeve, a flange surrounding the upper end of the tubular member within the sleeve and a spring surrounding the tubular member between the flanges, to define a yieldable connection between said member and coupling, a valve provided in the lower end of the tubular member and means whereby relative movement of the coupling and tubular member will operate the valve.

In testimony whereof I affix my signature.

WALTER GEHLBACH.